United States Patent
Hayashi et al.

(10) Patent No.: US 7,171,481 B2
(45) Date of Patent: Jan. 30, 2007

(54) VALIDATING A DATA LINK BEFORE ITS ACCESS

(75) Inventors: Ross H. Hayashi, Sacramento, CA (US); Anatole V. Farci, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 10/128,887

(22) Filed: Apr. 23, 2002

(65) Prior Publication Data

US 2003/0200258 A1 Oct. 23, 2003

(51) Int. Cl.
*G06F 15/173* (2006.01)

(52) U.S. Cl. .................... 709/229; 713/168; 715/501.1

(58) Field of Classification Search ................ 709/203, 709/206, 217, 227, 229, 218, 205; 715/501.1; 713/168
See application file for complete search history.

(56) References Cited

U.S. PATENT DOCUMENTS

| | | | | |
|---|---|---|---|---|
| 6,092,074 A | * | 7/2000 | Rodkin et al. | 707/102 |
| 6,658,000 B1 | * | 12/2003 | Raciborski et al. | 370/386 |
| 6,751,777 B1 | * | 6/2004 | Bates et al. | 715/501.1 |
| 6,779,178 B1 | * | 8/2004 | Lloyd et al. | 717/174 |
| 6,785,659 B1 | * | 8/2004 | Landsman et al. | 705/14 |

* cited by examiner

*Primary Examiner*—Abdullahi Salad
(74) *Attorney, Agent, or Firm*—Steven D. Yates

(57) ABSTRACT

Validating a data link before its access. Received electronic documents often include a link, such as a user selectable hyperlink or the like. Sometimes the links are compound links identifying a click-stream server seeking to record user activity, as well as a resource desired by the user clicking on the link. Selecting the link results in statistics being recorded, and then the click-stream server redirects the user to the desired resource. Unfortunately, sometimes the click-stream server is unavailable, which blocks access to the desired resource, and selecting the link may result in a long time out delay while waiting for an error regarding inability to reach the click-stream server. One of several techniques disclosed herein is to put a tag in the electronic document to cause programming code to check availability of a click-stream server. Links are constructed to bypass unavailable click-stream servers and access a desired resource.

17 Claims, 4 Drawing Sheets

FIG. 3

```
302— <HTML><HEAD><TITLE>Newsletter</TITLE>
304— <SCRIPT LANGUAGE = "JAVASCRIPT">
306— var isAlive = false;
308— function IsServerAlive()
      {    return isAlive;
      }
310— function OnLoadCheck()
      {    isAlive = true;
      }
312— function LinkActivation( sParams )
      {    if( IsServerAlive() )                    316
      {         LogClickStreamData( sParams );
314—      }
          else
          {    RedirectDocURL( sParams );    318
          }
      }
320— function RedirectDocURL( sParams )
      {    <<Code to clean up sParams and determine embedded
322—      link to desired resource. Assume code sURL[0] is
           used to store the embedded link. >>
324—      window.open(sURL[0]);
      }
326— function LogClickStreamData( sParams )
      {    window.open( document.all(sParams).id);
328— }
     </SCRIPT></HEAD>
330— <IMG src="pic.gif" onLoad="JAVASCRIPT:OnLoadCheck()">
332— <a id="http://click-server.com/log.asp?redirect='direct|
334—      http://other-server.com/resource^userID|123^otherVariable|value^etc....
          onclick="JAVASCRIPT:LinkActivation("IDENTIFIER")"
336— name="IDENTIFIER" value="http://other-server.com/resource" </a>
              <<OTHER WEB PAGE CODE HERE>>    338
340— </BODY></HTML>
```

← 300

VALIDATING A DATA LINK BEFORE ITS ACCESS

FIELD OF THE INVENTION

The invention generally relates to validating a link to network resources before its access, and more particularly to validating a link comprising a reference to a first server, along with an embedded reference to a second server, such that if the first server is unavailable, link activation results in direct access of the second server.

BACKGROUND

Often, it is convenient to embed links to network resources within electronic documents. As used herein, electronic documents include e-mail messages, Internet web pages, or other electronically distributable data that may include links to network resources (hereafter linked resource). For example, one may receive an e-mail message including a link to a weekly status report residing on a server, where selecting the link causes an information browser, such as the Internet Explorer Internet browser of Microsoft Corporation of Redmond Wash., to open and display the linked resource.

Unfortunately, the server hosting the linked resource may be down, or there may be communication issues that prevent access to the linked resource. In such circumstance, activating the link, e.g., by clicking on it with a mouse pointer, or otherwise activating the link with a selection tool, generally results in a lengthy time out period before it is determined that the linked network resource is unavailable. For example, the Microsoft Internet Explorer application program may take 30 seconds, or more, before it determines that the linked resource cannot be accessed, and provides an error message.

Various approaches have been attempted to avoid such time outs. The simplistic, and often used solution, is to simply assume all links are valid, on the theory that the electronic document would not have been sent out with invalid links. This is generally not a safe assumption. Another approach has been to encode the received electronic document with a programming language, such as Java Script, Visual Basic, etc., where the electronic document incorporates programming code that automatically attempts to validate links to network resources. However, this approach has problems, since noted above, it may take a long time to confirm unavailability of a resource, and a user may attempt to activate a link, e.g., click-on it or other wise select it, before the link can be verified.

BRIEF DESCRIPTION OF THE DRAWINGS

The features and advantages of the present invention will become apparent from the following detailed description of the present invention in which:

FIG. 3 illustrates exemplary JavaScript code according to the FIG. 2 embodiment that may be embedded within an HTML formatted electronic document.

DETAILED DESCRIPTION

Figure 1:
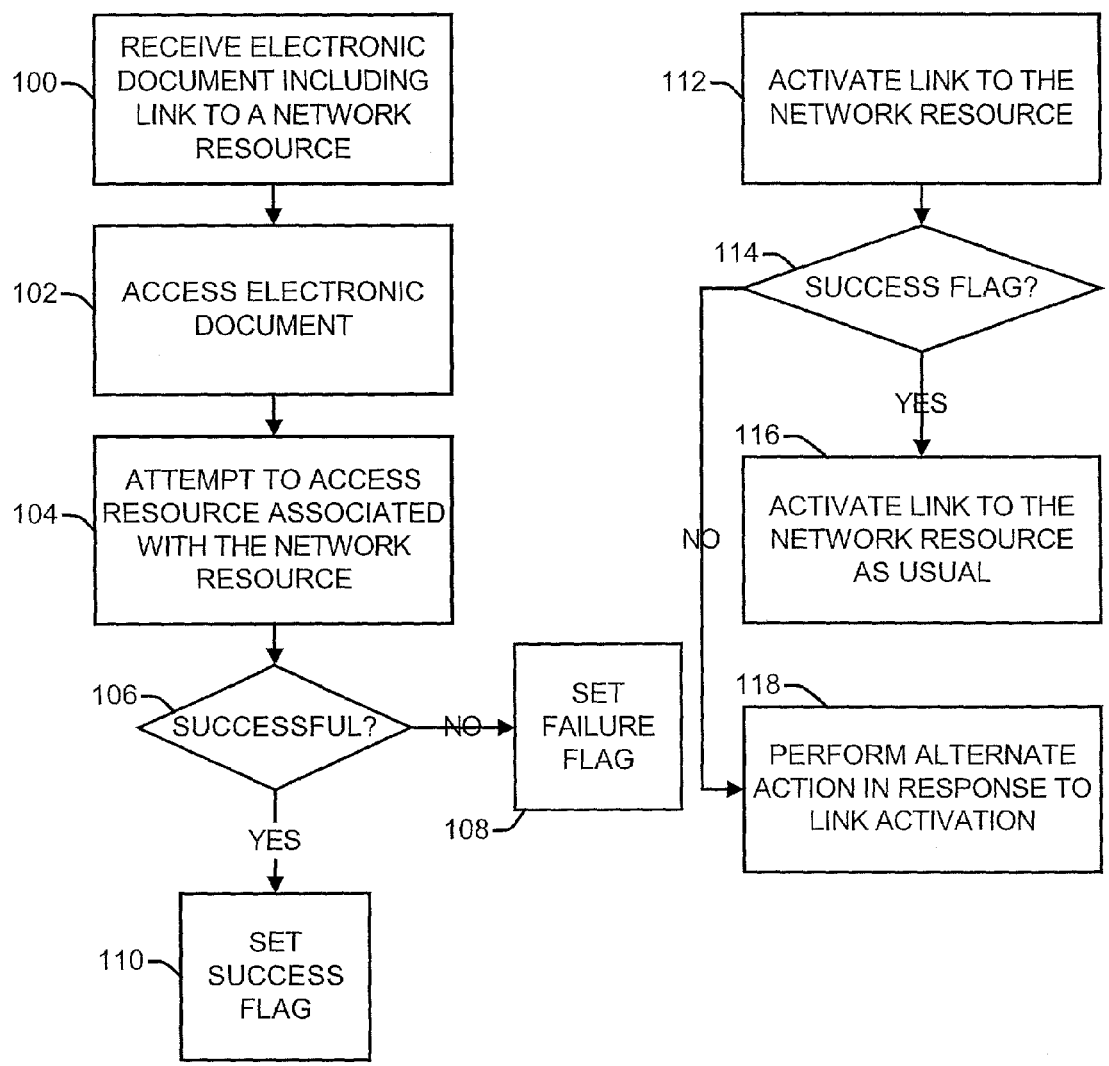
FIG. 1 illustrates a flowchart according to one embodiment for validating a link to a network resource before the link is accessed.

FIG. 1 illustrates a flowchart according to one embodiment for validating a link to a network resource before the link is accessed. As illustrated, an electronic document, such as a HyperText Markup Language (HTML) formatted e-mail message, is received 100 over a network, where the electronic document includes a link to a network resource stored on a server.

To avoid a lengthy time out incident to a user activating the link for the network resource when the server hosting the network resource is unavailable, prior to activating the link, a resource associated with the network resource (hereafter "the associated resource") is first accessed to determine availability of the server. In one embodiment, the associated resource is a small image file, e.g., 1 pixel. A small image is used since loading a small image typically quickly results in an error if the server hosting the image is unavailable. It will be appreciated that other resources on the server may be associated with the network resource so long as an access error occurs more quickly than an access error for the linked network resource.

In the illustrated embodiment, it is assumed the electronic document is received in an environment supporting JavaScript, Visual Basic, or some other programming construct. (For example, most current e-mail readers support scripting languages). It will be appreciated by one skilled in the art that many different programming languages or code directives may be used depending on the nature of the environment receiving the electronic document. The received 100 electronic document is assumed to contain program code to attempt loading the associated resource when the electronic document is accessed, for example, when an e-mail message is opened for reading. This program code may include explicit code to detect access of the electronic document, e.g., opening an e-mail message for reading, or the attempt to load the associated resource may occur automatically inherent to the operation of the environment receiving the electronic document. For example, an e-mail reader may automatically execute embedded program code when an e-mail message is opened.

On accessing 102 the electronic document, e.g., opening an e-mail message for reading, an automatic attempt 104 is made to access the associated resource. A test 106 is performed to determine whether accessing the associated resource was successful. If successful, a flag is set 108 to indicate success, and if not successful, the flag is set 110 to indicate failure.

In one embodiment, when the link to the network resource is activated 112, e.g., highlighted with a mouse pointer and an appropriate mouse button clicked, a test 114 is performed to determine the state of the flag that was set 108, 110 from the access test 106. If the flag indicates the server hosting the network resource is available, then the link is activated 116 as usual. However, if the flag indicates the server hosting the network resource is not available, the link action is replaced 116 with an alternate action, such as the loading of a different network resource. It will be appreciated that the replacement 116 may occur dynamically as the link is activated. For example, the link may incorporate JavaScript or other code that dynamically tests the flag. Alternatively, rather than setting 108, 110 a flag, instead the link within the electronic document is rewritten depending on the result of the test 108.

Figure 2:
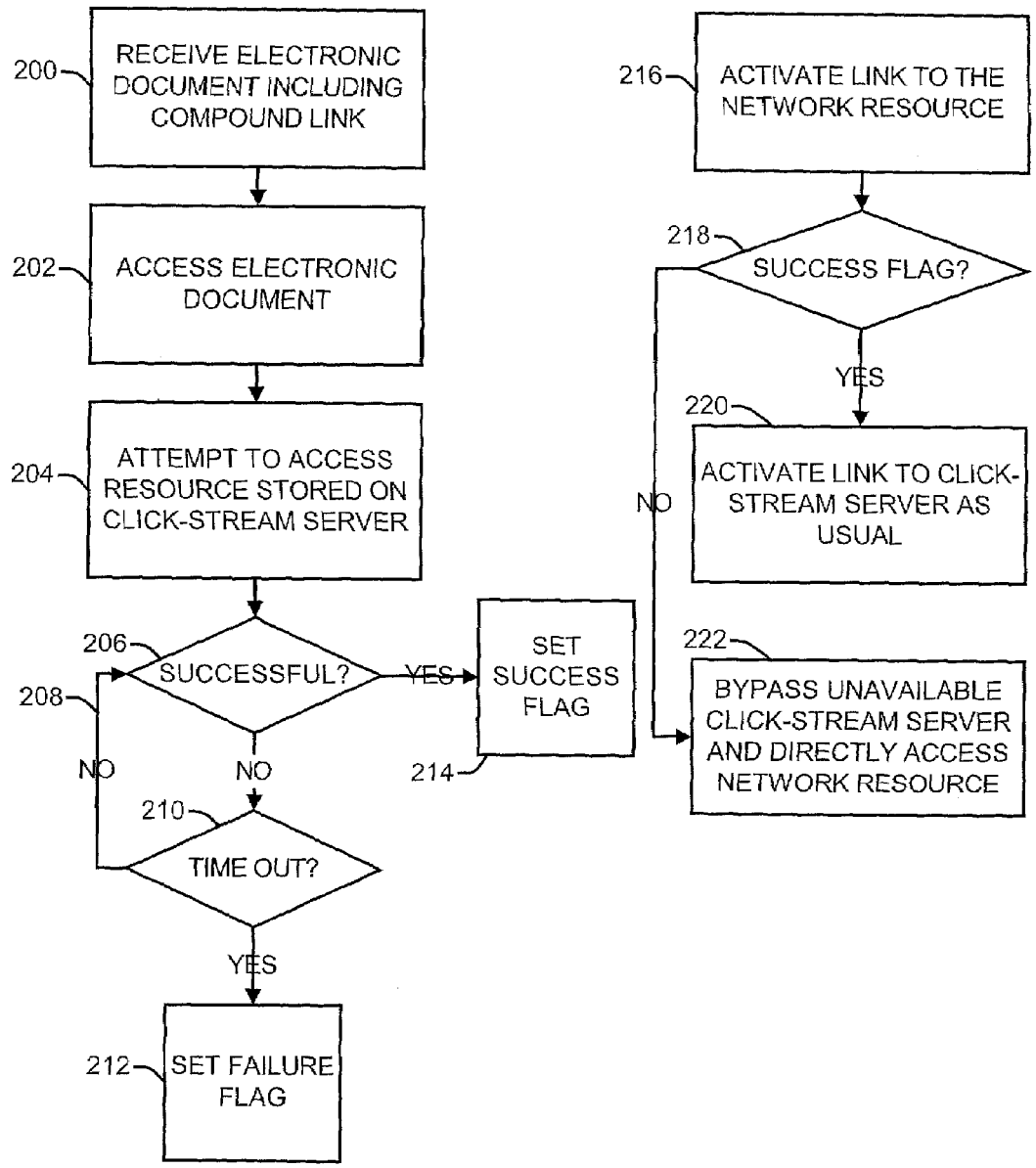
FIG. 2 is illustrates a flow chart for click-stream tracking with error-recovery when a server to receive click-stream data is unavailable.

FIG. 2 illustrates exemplary use of FIG. 1 techniques to implement click-stream tracking with error-recovery when a server to receive click-stream data is unavailable.

As used herein, the term "click-stream" refers to data tracking a user's interaction with a user interface, e.g., the interface to the FIG. 1 environment receiving 100 the electronic document. For example, in the Internet browser context, the term is commonly used to refer to a sequence of clicks or pages requested by a visitor as the visitor user the browser user interface to explore a web site. An electronic document, such as an e-mail message, may include links to network resources, where the links are "compound links" having two parts, an address part that causes a connection to be made with a server that compiles click-stream data, and a data part that may contain an embedded link to another resource that a user is actually trying to reach.

For example, in the Internet browser context, the link may be a Uniform Resource Locator such as http://ClickStream-Server/getStatistics.asp?target=http://real-destination.com, where a user of a web browser clicks on the link and causes the web browser to connect to a getStatistics ASP page on the ClickStreamServer. Once connected, the server may obtain various click-stream data about the user, and after recording statistics, the user's browser may then be redirected to where the user really wanted to go, e.g., http://real-destination.com. A common problem with such links, however, is that the server compiling statistics, e.g., ClickStreamServer, may be unavailable, while the desired network resource, e.g., http://!real-destination.com, may be available. Thus, regardless of the network resource actually sought by a user, the network resource cannot be reached until the server becomes available to redirect the browser to the desired network resource.

The techniques discussed above with respect to FIG. 1 can be applied in the click-stream context as follows. An electronic document, such as an e-mail message, is received 200, where the electronic document contains a compound link having two parts as discussed above, linking to a server gathering click-stream data, and containing an embedded reference to another network address or resource which the user is actually trying to reach. Similar to the operation of FIG. 1, when the electronic document is accessed 202, this access is detected, resulting in an attempt 204 to access a test resource, such as a small image file, stored on the server gathering click-stream data.

It will be appreciated that an electronic document may include multiple links, each having a different click-stream server, thus requiring accessing multiple test resources on multiple click-stream servers. User activity may be used to identify a link about to be activated, and attempts to load test resources restricted to such links. For example, a mouse-over event may indicate impending link activation. Or, attempts to access associated resources may be made for links proximate to an area of user activity within the electronic document. For example, if a link is (about to be) activated, proximate links may be inspected for their click-server's availability. For simplicity of presentation herein, a single link and click-stream server is assumed.

A test 206 is performed to see if the test resource was successfully accessed, e.g., whether the small image loaded. If not, processing may loop 208 for some time out period until either the test indicates a successful access, or the loop times out 210. If the loop times out, a flag is set 212 to indicate failure to load the test resource. If the image loads, then the flag is set 214 to successful loading of the test resource. When a link is activated 216, e.g., clicked, the flag is tested 218, and if the click stream server is available, the link is processed 220 as usual, e.g., a network connection is made to the click-stream server per the link and the click-stream server gets to record data before redirecting the user to a desired network resource identified in the data portion of the compound link. However, if the test 218 indicates the click-stream server is not available, activating the link results in a direct access 222 of the desired network resource, bypassing the unavailable click-stream server.

FIG. 3 illustrates an exemplary JavaScript code fragment according to the FIG. 2 embodiment that may be embedded within an HTML formatted electronic document 300 such as a web page, e-mail document, etc.

The first line of code 302 sets up a basic web page. The following line 304 indicates the start of JavaScript code within the HTML formatted electronic document. Line 306 sets a global variable "isAlive" to false; this variable is used to track whether a server referenced in a compound link is currently available. By default, the server is presume to be unavailable. Line 308 begins a function IsServerAlive, which simply returns the current value of the isAlive variable. Line 310 begins a function OnLoadCheck, which if executed, sets the isAlive variable to true.

Line 312 begins a function LinkActivation, which is called when a link in the electronic documents is selected. This function takes sParams as a parameter, and this parameter contains information for logging user click-stream data, e.g., the link may contain variable name/value pairs that can be passed to a click-stream server to track activity. In particular, the parameter contains a compound link referencing a click-stream server and a resource desired by a user (see line 332). LinkActivation calls IsServerAlive on line 314, and if the server is alive, the function LogClickStreamData on line 316 is called with sParams so that the click-stream data may be recorded which parses sParams and records the click-stream data. If the server is unavailable, then on line 318 the function RedirectDocURL is called with sParams so that the embedded link to a network resource can be extracted from the link and accessed directly.

Line 320 begins the function RedirectDocURL which includes code starting on line 322 to inspect sParams to identify the link clicked on, and to deconstruct the link to identify within it the embedded link to a resource desired by a user. Particular code is not illustrated as links may be encoded in any proprietary format that may be deconstructed by this function, see, e.g., an exemplary coding format on line 332. It will be appreciated that various techniques may be used to pass the link clicked on to the function. In the illustrated embodiment, a compound link is passed as the sParams argument to functions, and this compound link may also reference tag variables (e.g., named variable/value pairs) which may store other values. Once the desired resource is identified, on line 324 it is accessed; as illustrated, a new document window is opened to contain the desired resource, however another action may be performed.

Line 326 begins the function LogClickStreamData. Since the click-stream server is already known to be alive, it is simply called with the sParams parameter, allowing the server to extract desired click-stream data from the parameter. The click-stream server then redirects a user's application program, e.g., an information browser towards a desired resource.

Line 328 indicates the end of the exemplary JavaScipt code, and the end of the "HEAD" section of the HTML formatted document.

Line 330 contains an IMG tag. This presence of the IMG tag directs the environment receiving the HTML formatted electronic document to load the specified image. It is assumed that the referenced image is stored on the click-stream server. Contained in the IMG tag is an onload directive identifying the "OnLoadCheck" function of line

310. If the image successfully loads, then the identified OnLoadCheck function is called, resulting in the server isAlive variable being set to true, and thus indicating to the other functions that the click-stream server is available for receiving click-stream data.

Line 332 starts the definition for an exemplary link that may be clicked on and that will result in click-stream data being recorded if the click-stream server is determined to be alive. The illustrated link contains an "id" variable that uniquely names the link with the contents of the compound link that is accessed when the link is activated, e.g., clicked or otherwise activated. The onclick directive is called when the link is activated. The onclick directive instructs the environment receiving the electronic document to execute the LinkActivation function of line 312. The LinkActivation function is called on line 334 with a parameter including the compound link referencing a click-stream server, click-stream data, and a reference to a resource desired by a user.

In the illustrated embodiment, the compound link contains name/value pairs separated by a vertical bar (|), with a carat (^) separating name/value definitions. Thus, as illustrated, the link references an active server page (ASP) "log.asp" on a click-stream server "click-server.com", along with variables "userID" and linked" and their values. It will be appreciated that arbitrary information may be associated with a link and passed on to a click-stream server. For example, the variable "linkID" has the value "IDENTIFER" which in turn references a variable having a value of a direct link to a resource desired by a user. When the link is activated, if the click-stream server is unavailable, the compound link will be parsed by RedirectDocURL to identify the resource desired by the user, and that resource will be directly accessed on line 320.

Line 338 references other web page code that might be within the electronic document, e.g., the text of an e-mail message or other data. Line 340 closes the definition of the HTML formatted electronic document.

Thus, as is illustrated in the FIG. 3 exemplary code fragments and pseudocode, an IMG tag can be used to validate the availability of a server, such as a click-stream server, before links referencing to the server are activated. When the server is unavailable, such preliminary checking may say significant time in not having to await time out errors, while also affording access to desired resources.

Figure 4:
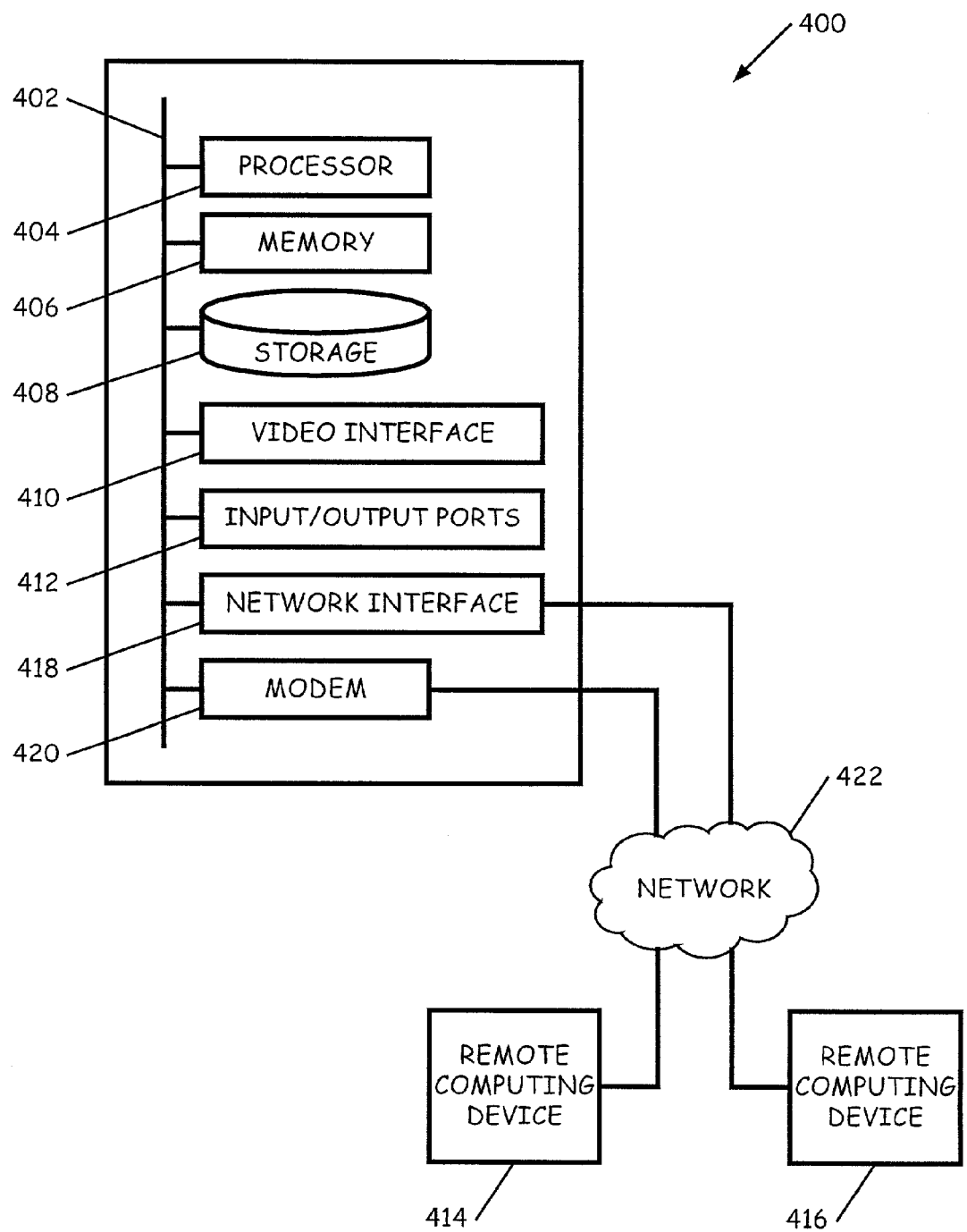
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented. The illustrated environment includes a machine 400, which may be configured to perform the operations illustrated in FIG. 1 or 2, or execute the HTML and JavaScript code of FIG. 3. As used herein, the term "machine" includes a single machine, such as a computer, handheld device, etc., or a system of communicatively coupled machines or devices.

Typically, the machine 400 includes a system bus 402 to which is attached processors 404, a memory 406 (e.g., random access memory (RAM), read-only memory (ROM), or other volatile or non-volatile memory), storage devices 408, a video interface 410, and input/output interface ports 412. The machine may be controlled, at least in part, by input from conventional input devices, such as keyboards, mice, joysticks, as well as directives received from another machine, interaction with a virtual reality (VR) environment, biometric feedback, or other input source or signal.

The machine may also include embedded controllers, such as Generic or Programmable Logic Devices or Arrays, Application Specific Integrated Circuits, single-chip computers, smart cards, or the like. The machine is expected to operate in a networked environment using physical and/or logical connections to one or more remote machines 414, 416 through a network interface 418, modem 420, or other data pathway. Machines may be interconnected by way of a wired or wireless network 422, such as an intranet, the Internet, local area networks, wide area networks, etc. It will be appreciated that network 422 may utilize various short range or long range wired or wireless carriers, including cellular, cable, laser, satellite, microwave, Bluetooth, optical, and infrared.

Portions of the invention may be described by reference to or in conjunction with program modules, including functions, procedures, data structures, application programs, etc. for performing tasks, or defining abstract data types or low-level level hardware contexts. Program modules may be stored in memory 406 and/or storage devices 408 and associated storage media, e.g., hard-drives, floppy-disks, optical storage, magnetic cassettes, tapes, flash memory cards, memory sticks, digital video disks, biological storage. Program modules may be delivered over transmission environments, including network 422, in the form of packets, serial data, parallel data, propagated signals, etc. Program modules may be used in a compressed or encrypted format, and may be used in a distributed environment and stored in local and/or remote memory, for access by single and multi-processor machines, portable computers, handheld devices, e.g., Personal Digital Assistants (PDAs), cellular telephones, etc.

Thus, for example, with respect to the illustrated embodiments, assuming machine 400 executes code operating in accord with the principles discussed above with respect to FIG. 2 or 3, then remote machine 414 may be a click-stream server seeking to record data about a user's interaction with an electronic document, and remote machine 416 a server actually having a resource desired to be accessed by the user. Alternatively, one of the remote machines (or another machine not illustrated) may operate as a privacy server affording privacy and/or security to data collected about particular users. For example, click-stream data may be routed through a remote machine, where the remote machine sanitizes the click-stream data to remove network characteristics (such as an origin Internet Protocol (IP) address) or click-stream data that might identify or be used to identify a particular user; sanitized click-stream data can then be provided to remote machine 414. It will be appreciated that remote machines 414, 416 may be configured like machine 400, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for validating a link to a network resource before attempting to access the linked network resource, comprising:

receiving over a network an electronic document including a compound link identifying a first server and having an embedded link to a second server, wherein the first server has a first network resource associated therewith and further wherein the electronic document is formatted according to a tag-based document description language;

attempting to access the first network resource to determine the availability of the first server before attempting to access the linked network resource;

determining whether the attempting to access the first network resource was unsuccessful; and if unsuccessful, directly accessing the second server according to the embedded link, wherein a script tag comprises program instructions to perform said determining the attempting to access the first network resource was unsuccessful, and to perform said directly accessing the second server according to the embedded link and the compound link comprises a call to said program instructions of the script tag.

2. The method of claim 1, wherein the compound link comprises click-stream data.

3. The method of claim 2, wherein the embedded link includes a reference to a second network resource associated with the second server, the method further comprising:

receiving the electronic document with an information browser; and providing the click-stream data to a click-stream server configured to: receive the click-stream data, and direct the information browser to access the second network resource of the second server.

4. The method of claim 1, wherein the compound link comprises click-stream data, the method further comprising:

providing the click-stream data to a click-stream server configured to receive the click-stream data; and receiving a redirect command from the click-stream server directing an information browser to access a second network resource of the second server.

5. The method of claim 1, wherein the compound link comprises a link identifier, the method further comprising:

tracking click-stream data based at least in part on the link identifier.

6. The method of claim 1, further comprising:

directly accessing the second server according to the embedded link in response to an activation of the compound link.

7. The method of claim 6, wherein the activation is responsive to a selected one of: moving a selection tool over the compound link, and selecting the compound link with the selection tool.

8. The method of claim 1, further comprising:

changing the compound link if said attempting to access the first network resource was unsuccessful.

9. The method of claim 1, further comprising:

receiving the electronic document with an application program configured to process programming instructions within the electronic document;

wherein the compound link comprises programming instructions to perform said determining the attempting to access the first network resource was unsuccessful, and to perform said directly accessing the second server according to the embedded link.

10. The method of claim 1, further comprising:

receiving the electronic document with an application program operable to receive electronic mail (e-mail).

11. The method of claim 1, wherein the compound link includes an embedded reference to a second network resource of the second server, the method further comprising:

receiving the electronic document with a first application program; and accessing the second network resource of the second server with a second application program.

12. The method of claim 11, wherein the first application program includes an electronic mail (e-mail) reader, and the second application program includes an information browser.

13. An article, comprising a machine-accessible medium having associated data, wherein the data, when accessed, results in a machine validating a link to a network resource before attempting to access the linked network resource, comprising:

receiving over a network an electronic document including a compound link identifying a first server and having an embedded link to a second server, wherein the first server has a first network resource associated therewith and further wherein the electronic document is formatted according to a tag-based document description language;

attempting to access the first network resource to determine the availability of the first server before attempting to access the linked network resource;

determining whether the attempting to access the first network resource was unsuccessful; and if unsuccessful, directly accessing the second server according to the embedded link, wherein a script tag comprises program instructions to perform said determining the attempting to access the first network resource was unsuccessful, and to perform said directly accessing the second server according to the embedded link and the compound link comprises a call to said program instructions of the script tag.

14. The article of claim 13 wherein the machine-accessible medium further includes data, when accessed by the machine, results in the machine performing:

determining click-stream data associated with the link; and providing the click-stream data to a click-stream server configured to: receive the click-stream data, and direct an information browser to access a second network resource of the second server.

15. The article of claim 13 wherein the machine-accessible medium further includes data, when accessed by the machine, results in the machine performing:

determining click-stream data associated with the compound link;

providing the click-stream data to a click-stream server configured to receive the click-stream data; and receiving a redirect command from the click-stream server directing an information browser to access a second network resource of the second server.

16. The article of claim 13 wherein the machine-accessible medium further includes data, when accessed by the machine, results in the machine performing:

determining an activation of the link; and directly accessing the second server according to the embedded link in response to the activation of the link.

17. The article of claim 13 wherein the data for determining the activation of the link further includes data, when accessed by the machine, results in the machine performing:

receiving a mouse-over event for the link.

* * * * *